United States Patent [19]

Blanc et al.

[11] 4,240,748
[45] Dec. 23, 1980

[54] HAND-HELD OPTICAL CHARACTER RECOGNITION WAND WITH VISUAL ALIGNER

[75] Inventors: Serge L. Blanc, Los Gatos; William R. Smith, Mountain View, both of Calif.

[73] Assignee: Caere Corporation, Los Gatos, Calif.

[21] Appl. No.: 918,814

[22] Filed: Jun. 26, 1978

[51] Int. Cl.³ ............................................. G01C 15/00
[52] U.S. Cl. ...................................... 356/138; 33/286
[58] Field of Search ............ 33/286, 185 R; 356/138, 356/154, 399; 235/472

[56] References Cited

U.S. PATENT DOCUMENTS

| | | | |
|---|---|---|---|
| 3,947,817 | 3/1976 | Requa | 250/566 |
| 4,078,869 | 3/1978 | Honeycutt | 33/286 |

*Primary Examiner*—John K. Corbin
*Assistant Examiner*—R. A. Rosenberger
*Attorney, Agent, or Firm*—Blakely, Sokoloff, Taylor & Zafman

[57] ABSTRACT

A hand-held optical reading device, commonly called a wand, for reading a field of printed characters. The wand includes a light source for illuminating the printed characters, a photodiode array and a lens for collecting reflected light and forming an image on the diode array corresponding to the printed characters. Apertures are formed in the lower portion of the wand housing for projecting light from the light source onto the surface upon which the characters are printed. The projected light forms a pattern on the surface which is used for visually aligning the wand with respect to character field.

6 Claims, 9 Drawing Figures

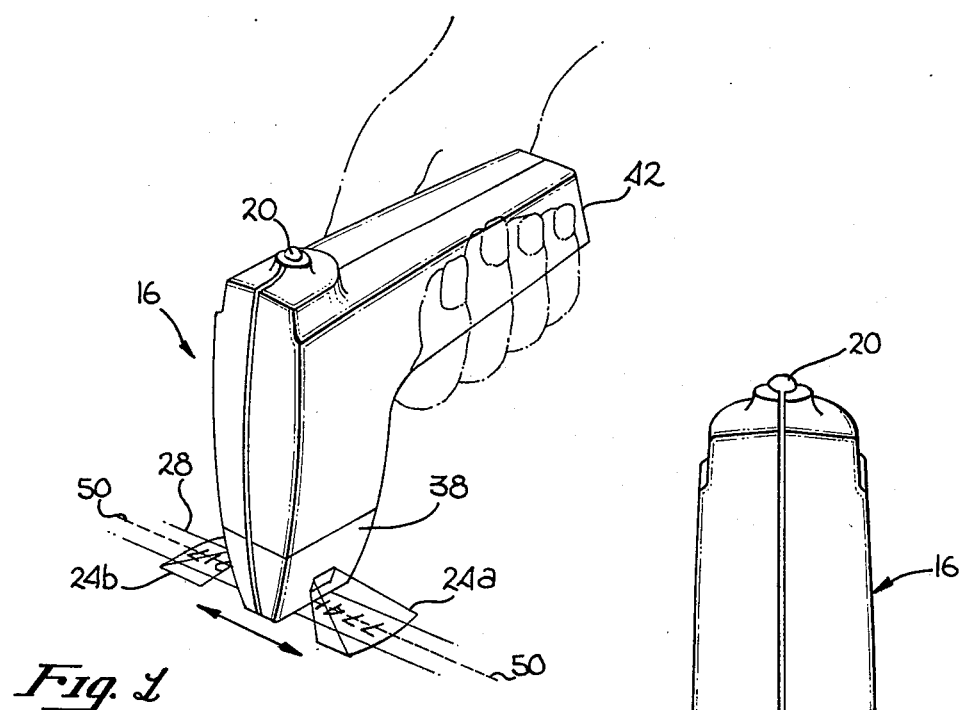
Fig. 1
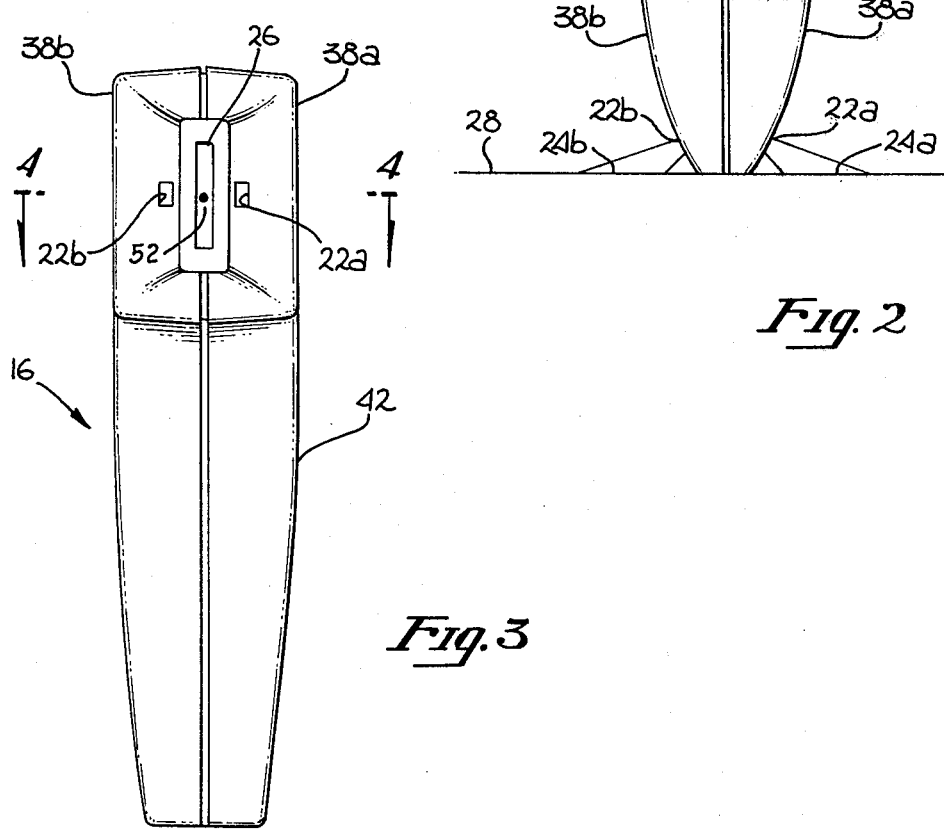
Fig. 2
Fig. 3

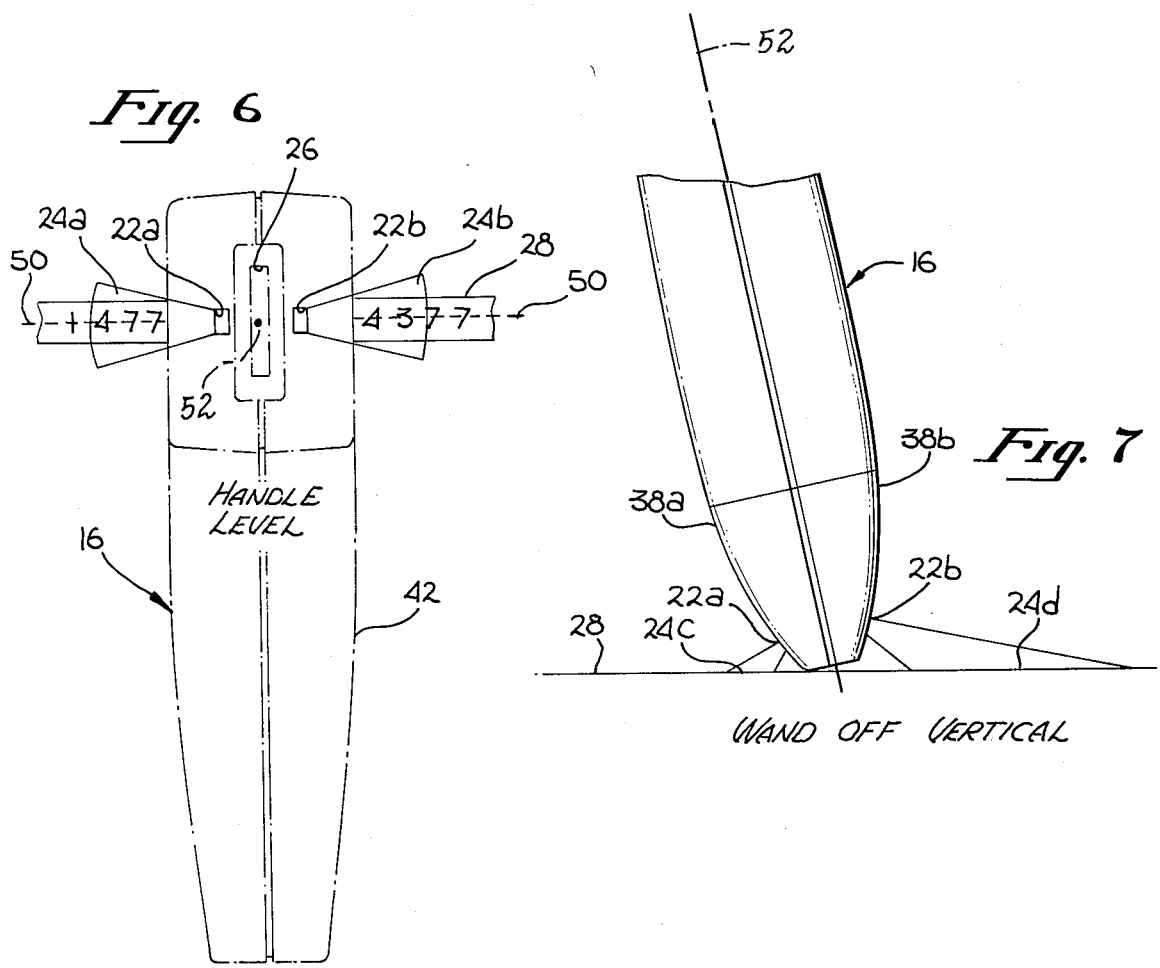
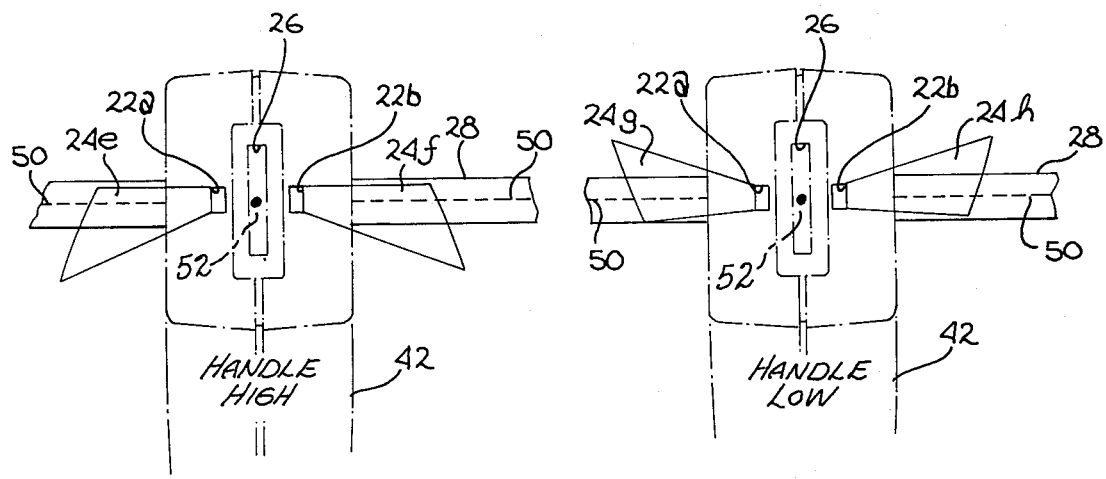

HAND-HELD OPTICAL CHARACTER RECOGNITION WAND WITH VISUAL ALIGNER

BACKGROUND OF THE INVENTION

1. Field of the Invention

This invention relates to hand-held optical reading devices and, more particularly, to hand-held readers or wands used in conjunction with a processing unit such as a character recognition processing apparatus.

2. Prior Art

Systems for optically reading alpha-numeric characters commonly utilize hand-held readers or wands (hereinafter these terms are used interchangeably) which are manually passed or scanned over the field of printed characters to be read. It is necessary in these systems that the wand be aligned within known tolerances during the scanning or wanding process with respect to the character field in order to insure that the characters are accurately read. Reading errors will occur, for example, if the path of wand travel is severely skewed or the wand is tilted or twisted during the wanding process.

U.S. Pat. No. 3,947,817 discloses a system which provides compensation for reading errors caused by the misalignment of hand-held wands. The system incorporates electronic processing means which permits reading despite some misalignment between the wand and the character field during the wanding process. However, even with such system, the operator must take reasonable care to align the wand with the characters since the amount of compensation provided by the system is limited.

The present invention is directed to a wand which allows the operator to provide "mechanical" alignment between the wand and characters. The disclosed wand may be used with a character recognition system which also provides electronic compensation means for correcting for misalignments which remain.

SUMMARY OF THE INVENTION

A hand-held optical reading device, commonly called a wand, for reading a field of printed characters is disclosed. The wand includes a light source for illuminating the printed characters, a photodiode array and a lens for collecting reflected light and forming an image on the diode array corresponding to the printed characters. Reading is accomplished by manually passing the wand over the printed characters, thereby causing the photodiode array to produce a video output which is further processed by a processing unit external to the wand housing, as is well-known. Apertures are formed in the lower portion of the wand housing for projecting light from the light source onto the surface upon which the characters are printed. The projected light forms a pattern on the surface which is used for visually aligning the wand with respect to the character field.

In the preferred embodiment, the light source is comprised of two spaced-apart incandescent lamps. The photodiode array is comprised of a 4×65 matrix of photodiodes which is disposed between the two lamps. The lens is positioned immediately below the array in a manner such that the character image is formed on the diode array surface. Electronic scanning means is provided which scans the output of the individual photodiodes so as to produce video data which is processed by a character recognition processing unit or similar processing apparatus.

The alignment means of the presently preferred embodiment wand is comprised of two apertures formed in the lower portion of the wand, at opposite sides of the housing. Each aperture is located between, and spaced equal distance from, the two lamps. The relative position of the apertures and the lamps and the shape of the apertures cause trapezoidal-like projections to be projected on the surface upon which the characters are printed. When the wand is properly aligned over the characters, the pattern comprising the two projections is symmetrical with respect to a vertical axis which passes through the center of the lens and photodiode array and the pattern is centered with respect to the character field.

BRIEF DESCRIPTION OF THE DRAWINGS

FIG. 1 is a perspective view of the hand-held wand in use.

FIG. 2 is a front view of the hand-held wand.

FIG. 3 is a bottom view of the hand-held wand.

FIG. 6 is a plan view showing the hand-held wand properly aligned with respect to the printed character field.

FIG. 7 is a rear view showing the hand-held wand tilted to the user's left.

FIG. 8 is a plan view showing the hand-held wand with the handle held high.

FIG. 9 is a plan view showing the hand-held wand with the handle held low.

DETAILED DESCRIPTION OF THE INVENTION

Figure 4:
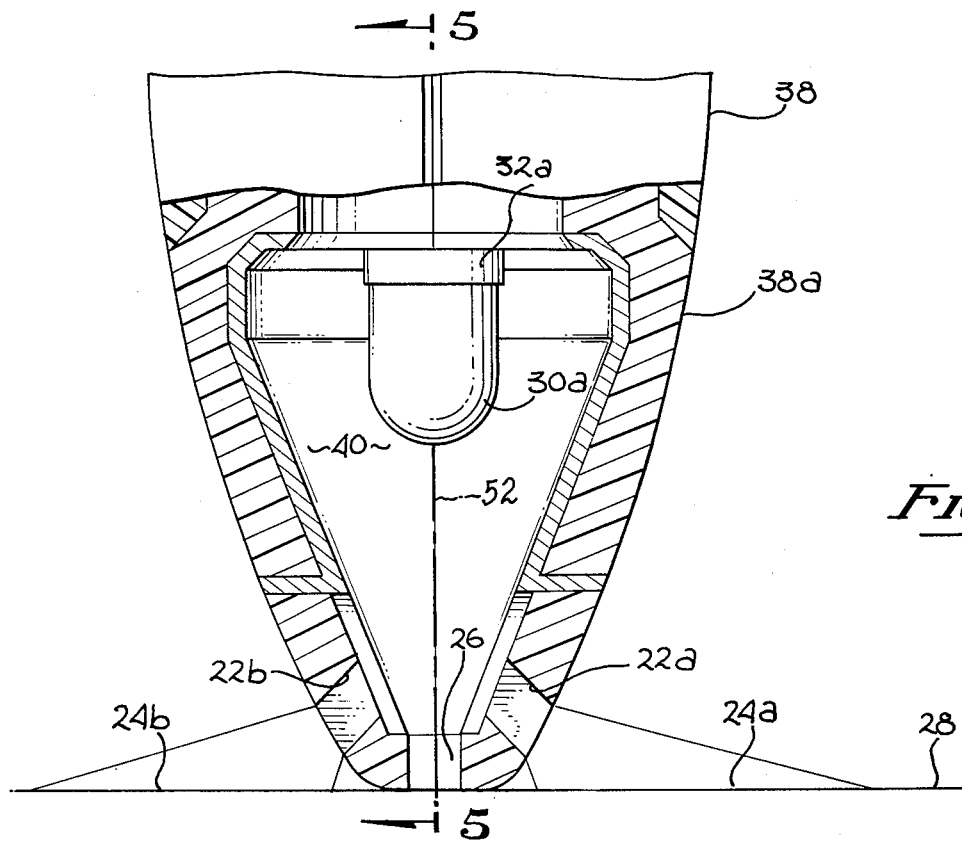
FIG. 4 is a partial cross-sectional view of the hand-held wand taken along line 4—4 of FIG. 3.

An improved hand-held optical reading means, commonly called a hand-held wand, is disclosed. The hand-held wand is used for reading a field of alpha-numeric characters and includes a novel means for visually aligning the wand with the field of characters. The improved wand is suitable for use with the apparatus and method for recognizing characters described in copending application, Ser. No. 898,822, filed Apr. 21, 1978 and which is assigned to the assignee of this application. However, the described wand may be used with numerous other commercially available optical character recognition systems.

Referring now to the drawings, a presently preferred embodiment of the wand may be seen in FIG. 1. The wand includes a housing 16, comprised of two injection molded halves joined together. Housing 16, which is preferably made from a lightweight material such as high-impact plastic, has a handle 42 adapted to be gripped by the operator. A light 20, which is mounted on the forward position of the handle 42, is used for indicating when the wand and associated processing means are operative. The lower portion of housing 16 terminates in a narrow end section or "nose" cone 38.

In the embodiment shown in FIG. 1, the wand is being used to read a label or tag 28 upon which is printed a field of alpha-numeric characters. Reading is accomplished by passing the cone 38 over the length of tag 28 along an imaginary center line 50—50 extending through the center of the character field. In the presently preferred embodiment, the wand may be passed over tag 28 or wanded in either direction as indicated by the arrow in FIG. 1. As will be more thoroughly discussed below, cone 38 includes a novel means for visually aligning the wand with the field of characters.

Figure 5:
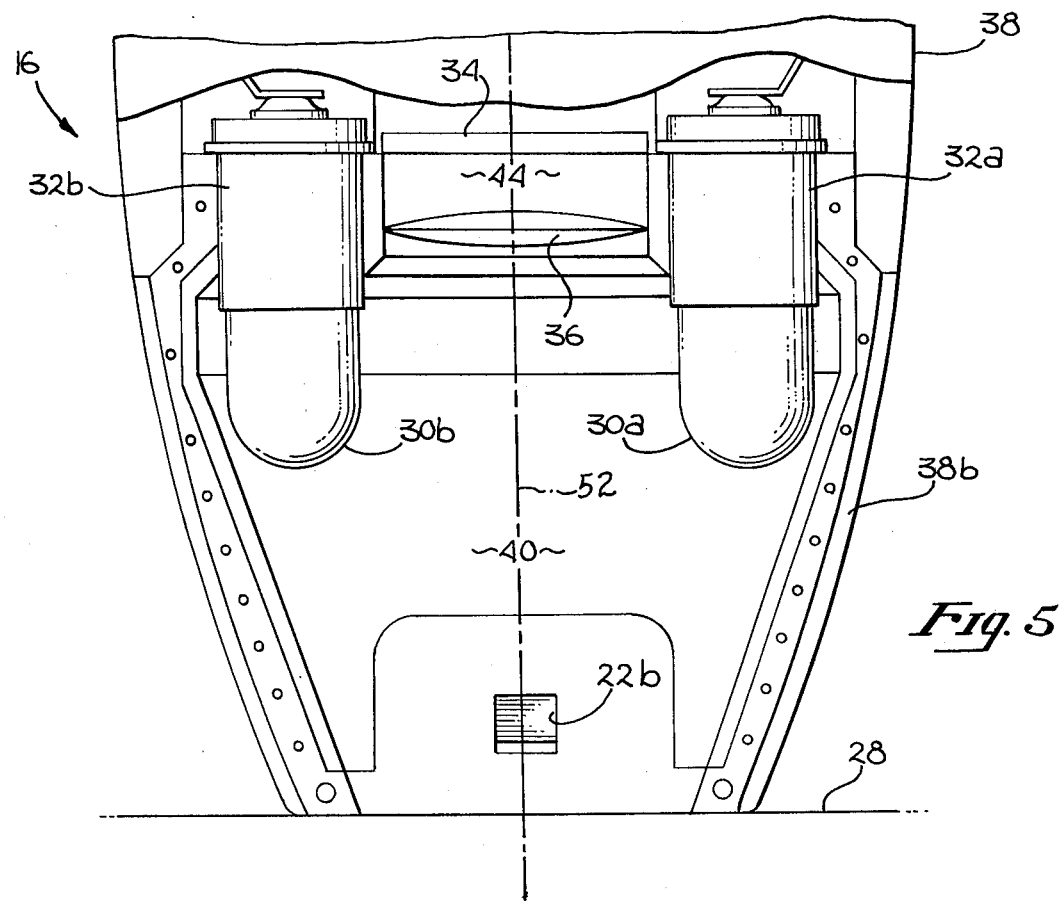
FIG. 5 is a partial cross-sectional view of the hand-held wand taken along line 5—5 of FIG. 4.

Referring to FIGS. 4 and 5, cone 38 includes two molded halves 38a and 38b which define a cavity when cooperatively abutting. This cavity has a relatively wide upper region which tapers to a narrow aperture or slit 26 in the end of the cone. The interior walls of the halves 38a and 38b provide light diffusing surfaces.

Two incandescent lamps 30a and 30b mounted within the upper portion of the cone cavity at opposite ends provide light both for illuminating the character for the photodiode array or the like and also for the alignment means of the present invention. Lamps 30a and 30b are mounted in sockets 32a and 32b, respectively, which are in turn mounted within circular openings formed by halves 38a and 38b.

A light detecting means, such as photodiode array 34, is mounted within the housing 16 between and immediately above sockets 32a and 32b. In the presently preferred embodiment, the array 34 is a 65×4 photodiode matrix which is substantially parallel to the surface of tag 28 when the user has properly aligned the wand.

Cone halves 38a and 38b also define a cylindrical shaped opening 44 located directly between lamp sockets 32a and 32b. Opening 44 is adapted to receive a lens 36 which is disposed between the photodiode array 34 and slit 26. As can best be seen in FIG. 5, photodiode array 34 is coaxial with respect to lens 36 and slit 26 so that the effective reading area of the wand, that is, the area within slit 26 in which a character can be read, is maximized.

Apertures 22a and 22b are defined by cone halves 38a and 38b, respectively, and provide the outlet for the aligning light pattern of the present invention. These apertures are spaced equidistant from lamps 30a and 30b (FIGS. 4 and 5) and extend through the walls of the cone halves 38a and 38b at an angle of approximately 45° with respect to horizontal. In the presently preferred embodiment, as mentioned, lamps 30a and 30b provide light both for reading the characters and for aligning the wand. However, each of these functions may be supplied with light by separate means.

It is important that the wand be properly aligned over the character field during reading, otherwise recognition may not occur. As shown in FIGS. 1, 2, 4 and 6, when lamps 30a and 30b are illuminated, apertures 22a and 22b form light projections 24a and 24b, respectively, on the surface which includes the characters. When the wand is held in proper alignment with the character field, vertical axis 52 intersects center line 50—50 (FIG. 6) and is normal to the character surface. When this occurs, the light pattern which is comprised of projections 24a and 24b will be symmetrical about vertical axis 55 and symmetrical about center line 50—50. (A pattern will have symmetry with respect to an axis or line, if, on being turned round on that axis or line for less than a complete revolution it coincides with the original position.) With the wand so aligned, diode array 36 will be substantially parallel to the surface, and projections 24a and 24b will have substantially trapezoidal-like shapes. The projections 24a and 24b which occur when the wand is correctly aligned are shown in FIGS. 1, 2, 4 and 6.

FIG. 7 illustrates one source of reading error caused by the tilting of the wand either to the left or to the right. This tilting causes distortion of the character image formed on the photodiode array. The light projections 24c and 24d from apertures 22c and 22d, respectively, form a composite pattern which is not symmetrical about axis 52, as may be seen in FIG. 7. This non-symmetrical pattern gives an immediate visual indication of such misalignment. It should be noted that a slight tilting will cause a relatively large change in the relative length of the two projections 24c and 24d since one projection will increase in length and one will diminish.

Reading error can also occur if the operator is holding handle 42 too high, as shown in FIG. 8, or too low, as shown in FIG. 9. In either case, the symmetry of the pattern about axis 52 is destroyed. For example, if the handle 42 is too high, the upper end of cone 38 will tilt away from the user causing projections 24e and 24f (FIG. 8) to shift away from tag 28 towards the user thereby destroying the symmetry of the pattern about axis 52 (and about center line 50—50). Similarly, if the handle is low, projections 24g and 24h will shift away from the user causing the symmetry of the pattern about axis 52 to change.

It is also possible that the user will skew the wand about vertical axis 52 so that slit 26 is not perpendicular to the field of characters. Similarly, the user may pass the wand over the field with the character field center line 50—50 not centered with the center of the effective reading area of the slit 26. In either case, the symmetry of the pattern with respect to center line 50—50 will be destroyed, a condition which can be readily detected. Moreover, the pattern in the direction of motion provides a guide for alignment with the field of characters.

The trapezoidal-like shape of the alignment projections 24a and 24b of the presently preferred embodiment is the result of a combination of factors including the placement of the apertures 22a and 22b with respect to lamps 30a and 30b, the angle at which the apertures pass through the cone halves 38a and 38b and the shape of the aperture cross-section. Obviously, other light pattern shapes can be projected. For example, light patterns comprised of four individual projections, with two projections bracketing the character field on each side of cone 38 when the wand is properly aligned, would also be suitable. Whatever pattern shape is used, the pattern should extend a sufficient distance away from cone 38 so that they can be viewed when wanding. Also, the pattern should be distinct and bright enough to be seen in high ambient light conditions. Finally, the pattern is preferably symmetrical about both the vertical axis 52 of the wand which extends through the center of the effective reading area and center line 50—50 when the wand is properly aligned so that the character field can be easily centered within the patterns and so that wand misalignments which result in an unsymmetrical pattern can be readily detected. Although one of the advantages of the presently preferred embodiment is its simplicity and use of the existing wand light sources, patterns may be produced using various combinations of lenses, apertures and additional light sources.

What has been disclosed is a novel hand-held optical reading device having a means for visually aligning the device with respect to a field of characters.

We claim:
1. An improved optical reading device comprising:
   a housing;
   light means mounted within said housing for illuminating characters;

light detecting means mounted within said housing for detecting light;

lens means mounted within said housing for receiving light reflected from said characters which are located within an effective reading area of said device and for forming an image corresponding to said characters on said light detecting means; and alignment means coupled to said housing for projecting a light pattern on the surface which includes said characters, said pattern being substantially symmetrical about a vertical axis of said device which extends through the center of said effective reading area when said device is properly aligned with respect to said surface;

whereby by aligning said symmetrical pattern relative to said characters, said device is aligned for the reading of said characters.

2. The device defined by claim 1 wherein the light for said projected light pattern originates at said light means.

3. The device of claim 1 wherein said light pattern is comprised of two separate light projections and is substantially symmetrical about a center line of said characters when said device is properly aligned with respect to said characters.

4. The device of claim 1 wherein said alignment means comprises at least two openings defined by said housing.

5. The device of claim 1 wherein said light detecting means and said lens means are substantially coaxial and said light detecting means comprises two separate light sources disposed on opposite sides of said light detecting means and said light means and said alignment means comprises two openings defined by opposite sides of said housing, each of said openings substantially equidistant from each of said light sources.

6. In an optical character recognition hand-held reader having a housing and a light source for illuminating characters through an effective reading area of said housing, an improvement comprising:

a pair of openings in said housing in optical alignment with said light source for projecting a predetermined pattern which is substantially symmetrical with respect to a vertical axis which extends through said effective reading area and substantially symmetrical about a center line of said characters when said reader is in predetermined alignment with said characters;

whereby said predetermined alignment may be readily viewed.

* * * * *